{ }
United States Patent [19]

Schmidt

[11] Patent Number: 5,225,662
[45] Date of Patent: Jul. 6, 1993

[54] FLEXIBLE HEATING ELEMENT FOR A HOT RUNNER HOUSING INCLUDING METHOD OF MANUFACTURE AND METHOD OF INSTALLATION

[75] Inventor: Harald Schmidt, Georgetown, Canada

[73] Assignee: Husky Injection Molding Systems, Ltd., Bolton, Canada

[21] Appl. No.: 820,082

[22] Filed: Jan. 13, 1992

[51] Int. Cl.⁵ ............................ F27B 14/00; H05B 3/02
[52] U.S. Cl. .................................. 219/421; 219/424; 219/550; 219/544; 425/549
[58] Field of Search .................... 219/420-424, 219/523, 544, 550, 549; 425/549, 568, 552, 570, 566

[56] References Cited

U.S. PATENT DOCUMENTS

| | | | |
|---|---|---|---|
| 2,995,646 | 8/1961 | Kawalle | 219/550 |
| 4,320,253 | 3/1982 | Fisher | 174/138 J |
| 4,464,565 | 8/1984 | Spangler | 219/550 |
| 4,603,667 | 8/1986 | Grünwald | 123/297 |
| 4,771,534 | 9/1988 | Gellert | 29/611 |
| 5,141,717 | 8/1992 | McRae | 422/82.01 |
| 5,147,663 | 9/1992 | Trakas | 425/549 |

Primary Examiner—Bruce A. Reynolds
Assistant Examiner—Michael D. Switzer
Attorney, Agent, or Firm—Bachman & LaPointe

[57] ABSTRACT

A flexible vertebra-like heating element useful in a hot runner housing of an injection molding machine including method of manufacture and method of installation.

6 Claims, 5 Drawing Sheets

FLEXIBLE HEATING ELEMENT FOR A HOT RUNNER HOUSING INCLUDING METHOD OF MANUFACTURE AND METHOD OF INSTALLATION

BACKGROUND THE INVENTION

The present invention relates to heaters and relates, in particular, to heaters useful in hot runner housings such as manifolds and injection nozzles of the type used in conjunction with injection molding machines.

DESCRIPTION OF THE PRIOR ART

In prior art heaters, the heating element takes the form of a rod or cartridge having a relatively stiff metallic sheath. Inherently, these structures are not very flexible and, for that reason, are not suitable for applications which require placing the rods into grooves or other recesses which involve a plurality of obtuse and acute angles.

Considerable effort and metal working is required to shape metal sheathed rod heaters to fit into receptacles, such as hot runner manifolds or injection nozzles, where positioning of the rod involves many twists, turns or bends.

Invariably, installation or placement of a metallic sheathed heater along a tortuous path involves bending stresses and other undesirable stresses resulting from hammering and otherwise forcing the heater into place. These stresses create cracks which jeopardize the internal structure as well as the overall integrity of the heater unit.

While these relatively rigid metal sheathed heating rods are operable and useful in many installations, they are not practical in applications which involve tortuous and convoluted configurations having a number of acute angles.

A typical prior art heating rod or cartridge is disclosed and described in U.S. Pat. No. 4,439,915 issued Apr. 3, 1984 to Gellert.

SUMMARY OF THE INVENTION

Consequently, it is a principal object of the present invention to provide, in combination, a flexible vertebra-like heating element and a hot runner housing.

A further feature of the present invention is the provision of a heating element for a hot runner housing which is inexpensive and relatively easy to install.

A further feature of the invention is the provision of a novel method of installing the heating element.

A further feature of the invention is the elimination of rod or cartridge heaters which require considerable manual bending to fit complex shapes.

A further feature is the provision of a heating element for a hot runner housing permitting the choice of a variety of heating wire configurations including a variety of wire gauges which are received into cored ceramic beads to develop a flexible heating element of any desired length.

A further feature is the provision of a novel heater installation process in which a groove is milled in the surface of a metallic hot runner housing to define a tortuous, generally continuous path. A heat curable ceramic adhesive paste is applied to the groove. Thereafter, a flexible heater in the form of a plurality of cored ceramic beads strung upon a heating wire is pressed into the groove and into the ceramic paste so that the paste is displaced upwardly about the beads. Next, an additional application of ceramic paste is applied over the beads to fill the groove and the top surface of the paste is smoothed with a suitable spatula or trowel.

Finally, after air drying, the composite hot runner housing-heater assembly is placed into an oven to cure the ceramic adhesive whereby the heater is fixed adhesively within the groove, spaced from the groove sidewalls of the groove.

If desired, the cured ceramic is sanded to provide a smooth surface transition between the ceramic and the metal surface of the face of the housing.

Frequently, it is desirable to paint or spray the surface of the cured ceramic paste to create a seal over the surface of the ceramic and at the joint between the housing and the ceramic.

A combined hot runner housing and a hot runner heater embracing certain other principles of the invention may comprise a hot runner housing having an internal flow path for thermoplastic material including at least one circuitous groove having sidewalls and obtuse and acute angles, a heating wire, a plurality of cored ceramic beads, said heating wire being received in said beads to define a string of beads further defining a flexible, vertebra-like structure, said structure being disposed in said groove spaced from said sidewalls, and ceramic material disposed in said groove surrounding said structure and in contact with said sidewalls to shield the beads and to fix the structure within said groove.

A further feature of the invention involves the method of preparing a ceramic bead string by combining the beads with a heating wire in continuous fashion.

That is, the beads are oriented and lined up in a telescoping arrangement by a feeder such as a vibratory feeder. The oriented line of beads is introduced into a length of tubing. While in the tubing, the heating wire is fed into the aligned beads to create a bead string. Thereafter, lengths of the bead string are cut and provided with appropriate electrical terminals or connectors.

Other features and advantages of the present invention will become more apparent from an examination of the succeeding specification when read in conjunction with the appended drawings, in which;

DETAILED DESCRIPTION

Figure 1:
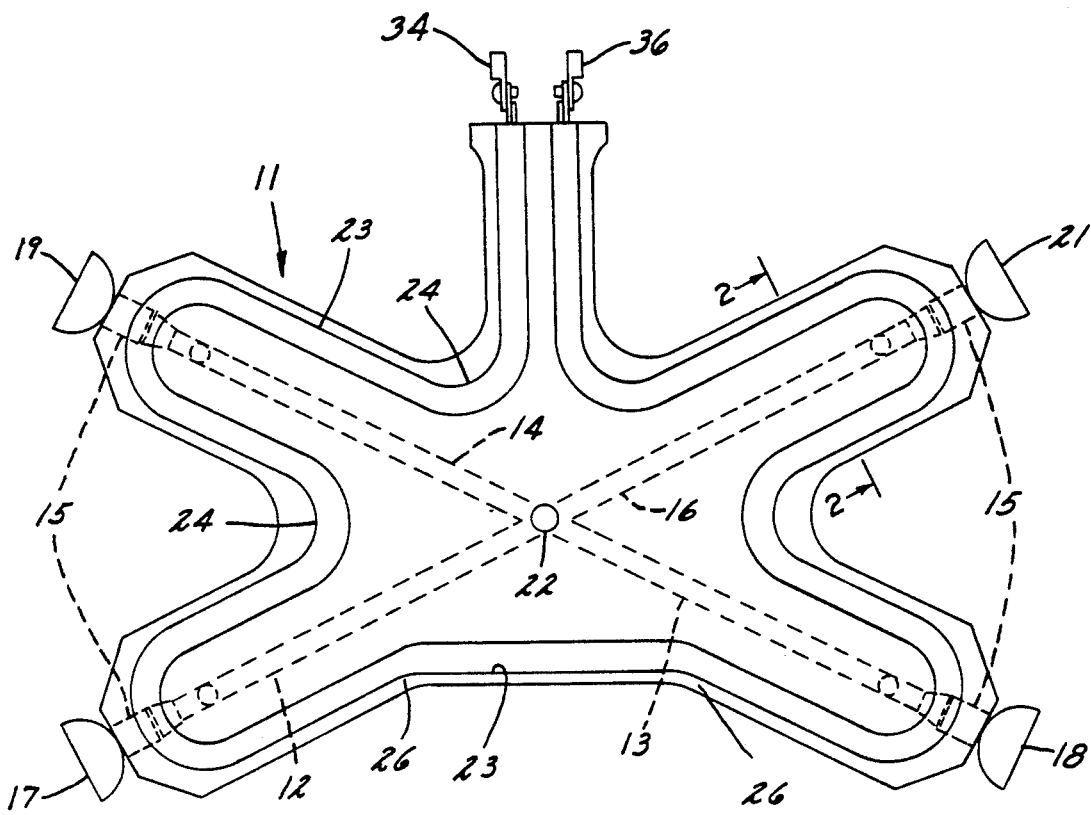
FIG. 1 is a plan view of a hot runner housing having a heater of the present invention in place wherein the housing includes internal passages for delivering thermoplastic material to 4 molds.
Figure 5:
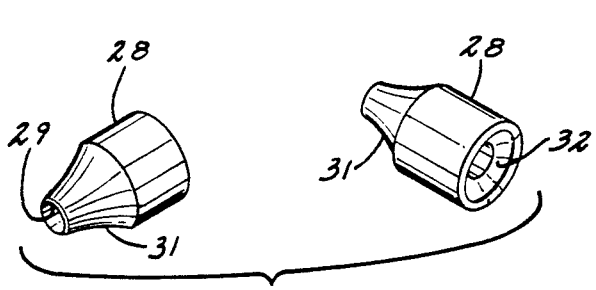
FIG. 5 is a perspective view of typical ceramic beads.
Figure 10:
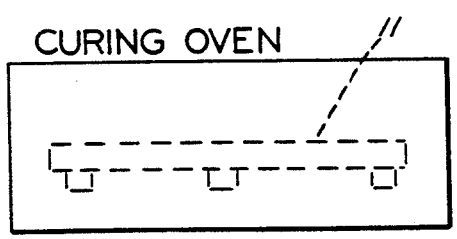
FIG. 10 shows schematically the oven curing step.
Figure 3:
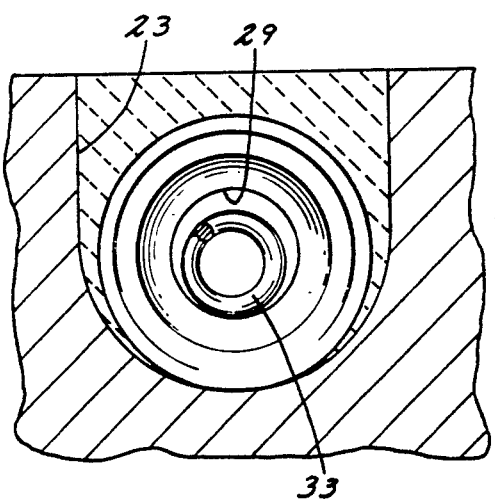
FIG. 3 is an enlarged vertical section of a portion of FIG. 2 showing details of a coiled heating wire within a ceramic bead.
Figure 2:
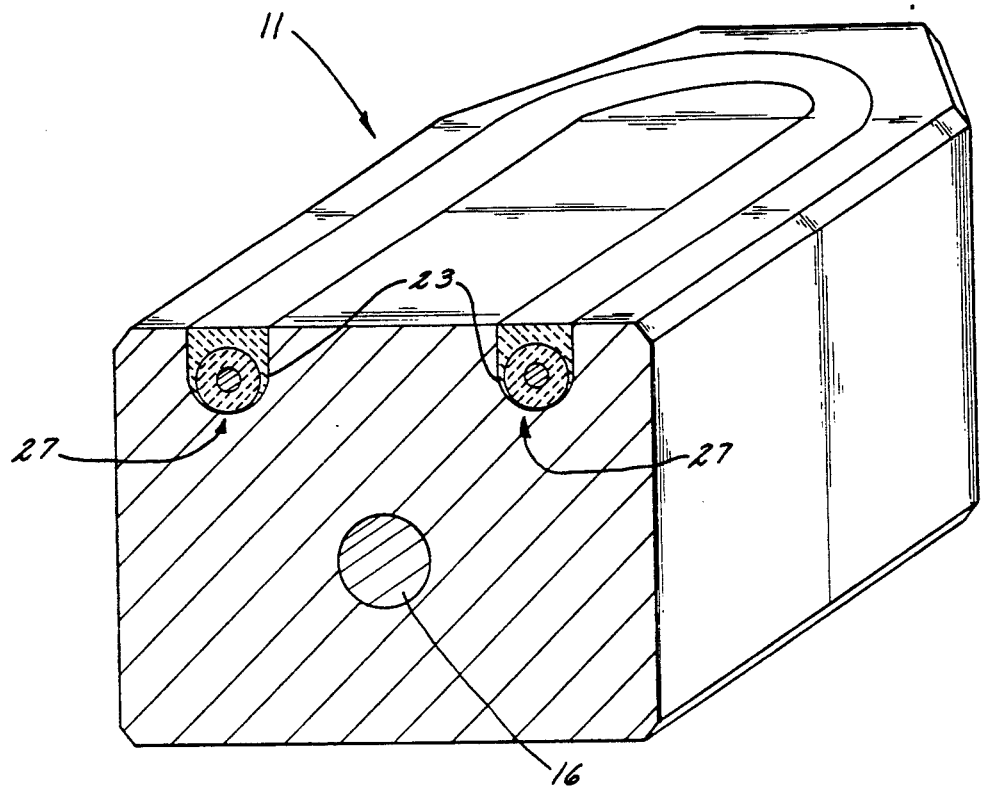
FIG. 2 is a vertical section of one wing of the hot runner of FIG. 1 as viewed in the plane of the line 2—2.

Referring now in detail to FIGS. 1 through 5, the reference numeral 11 indicates a metallic hot runner housing having melt channels 12, 13, 14 and 16, for supplying mold cavities 17, 18, 19 and 21, respectively, with thermoplastic material via nozzles 15 from a source 22, in well-known fashion. Details of channel valving and nozzle structure are not shown, in that the invention is directed to hot runner housing heater structure including the method of creating the heater and combining the heater structure with the hot runner housing.

The language "hot runner housing" is intended to include heated elements of an injection molding machine such as manifolds, barrels, distributors and nozzles having conduits therein providing a flow path for melt or thermoplastic material.

A groove 23 is formed in the hot runner housing defining a plurality of bends and return bends including acute and obtuse angles 24 and 26, respectively.

A bead string indicated generally at 27 is composed of a plurality of beads 28 having a core 29, a nose portion 31 and a counterbore 32 strung on a heating wire 33. The beads are fabricated of an electrical insulating ceramic material having a high resistance to thermal shock, high melting temperatures, and thus, high temperature capability.

Figure 4:
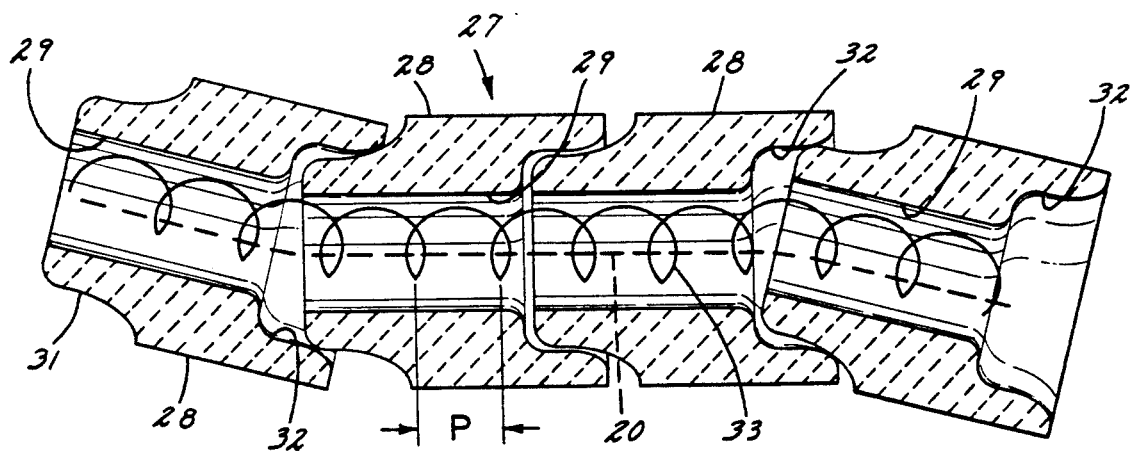
FIG. 4 shows a vertical section of a ceramic bead string or chain strung upon a coiled or helical heating wire.

A typical heating wire 33 Nc'Cr 80/20, for example, is coiled as shown in FIG. 4 with various leads or pitches P, depending upon the desired wire density. In the alternative, the heating wire may define straight runs as indicated by the dashed line 20 in FIG. 4.

When the beads 28 are strung upon the heating wire 33 (20) the nose portion 31, one bead nests movably in the recess or counterbore 32 of the next adjacent bead to develop a flexible, vertebra-like bead string.

The bead string terminates at electrical connections 34 and 36 as shown in FIG. 1.

The bead string is prepared in long lengths and, because of its flexibility, can be spooled for convenient storage or cut into predetermined lengths as manufactured in a manner which will be described in detail as this specification proceeds.

Referring to FIGS. 6–10, the manner of attaching the bead string to the hot runner housing includes forming a groove 23 in an exposed surface of the housing 11 by machining or by a suitable casting process.

Figure 6:
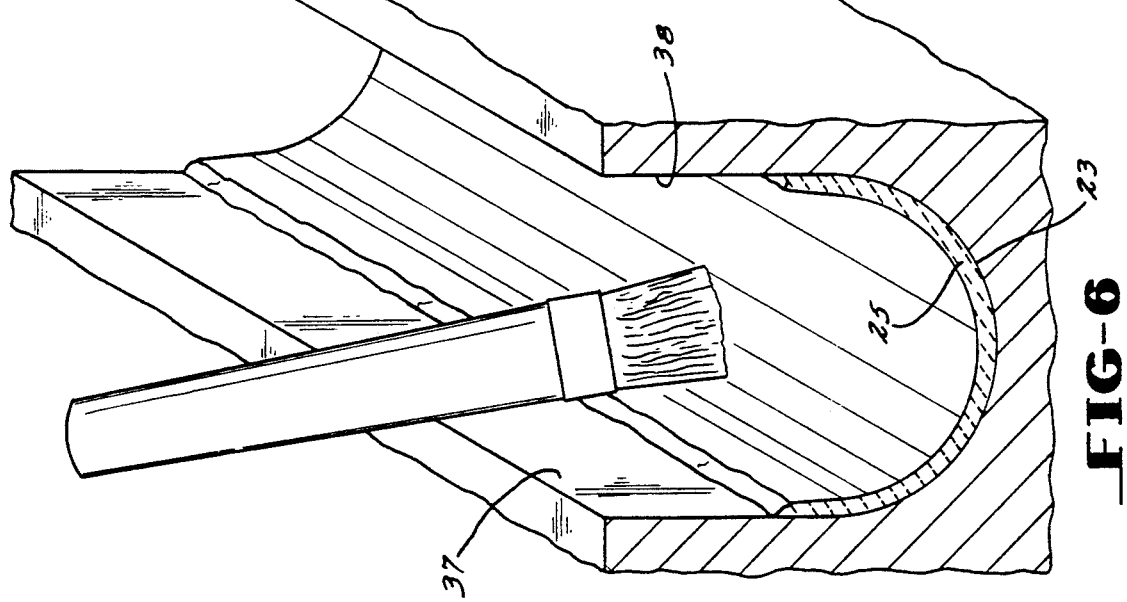
FIG. 6 shows the step of applying a first coating of ceramic adhesive paste to a groove machined or otherwise formed in a metallic housing.

A ceramic adhesive 25, in paste form, is then painted or otherwise spread about the bottom and a portion of the sidewalls 37-38 of the groove 23 as shown in FIG. 6.

The ceramic adhesive, heat curable after a period of air drying, adheres to the metallic hot runner housing and is capable of withstanding temperatures ranging from room temperature to 4000° F.

Typical ceramic adhesives are described in the following examples:

1. Ceramabond 751-Aremco Products Inc., Ossining, N.Y.

2 part system of a high temperature ceramic adhesive with an inorganic binder and magnesia powder having a high thermal expansion coefficient, excellent adherence to metals such as steel and withstanding temperatures to 3200° F. maintaining good electrical insulation.

2. Ceramabond 632

1 part system of a high temperature ceramic bonding material containing an inorganic binder and a high amount of mica filler having excellent adherence to metals and ceramics, good thermal properties, good electrical insulation and no cracking at heat expansion.

Figure 7:
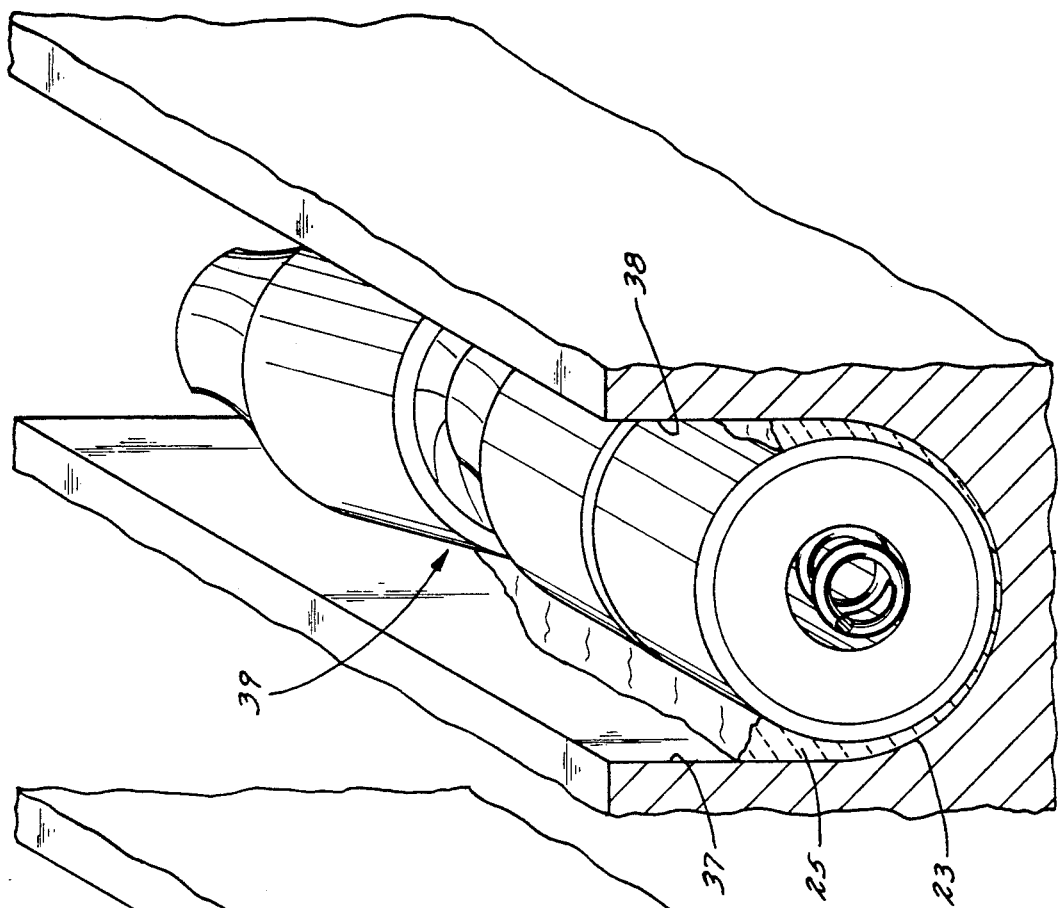
FIG. 7 shows the step of laying the bead chain upon the coating of FIG. 6 and pressing the bead chain into the coating.

Next, a length of bead string 39 is disposed upon the ceramic adhesive 25 and pressed into the position shown in FIG. 7.

Figure 8:
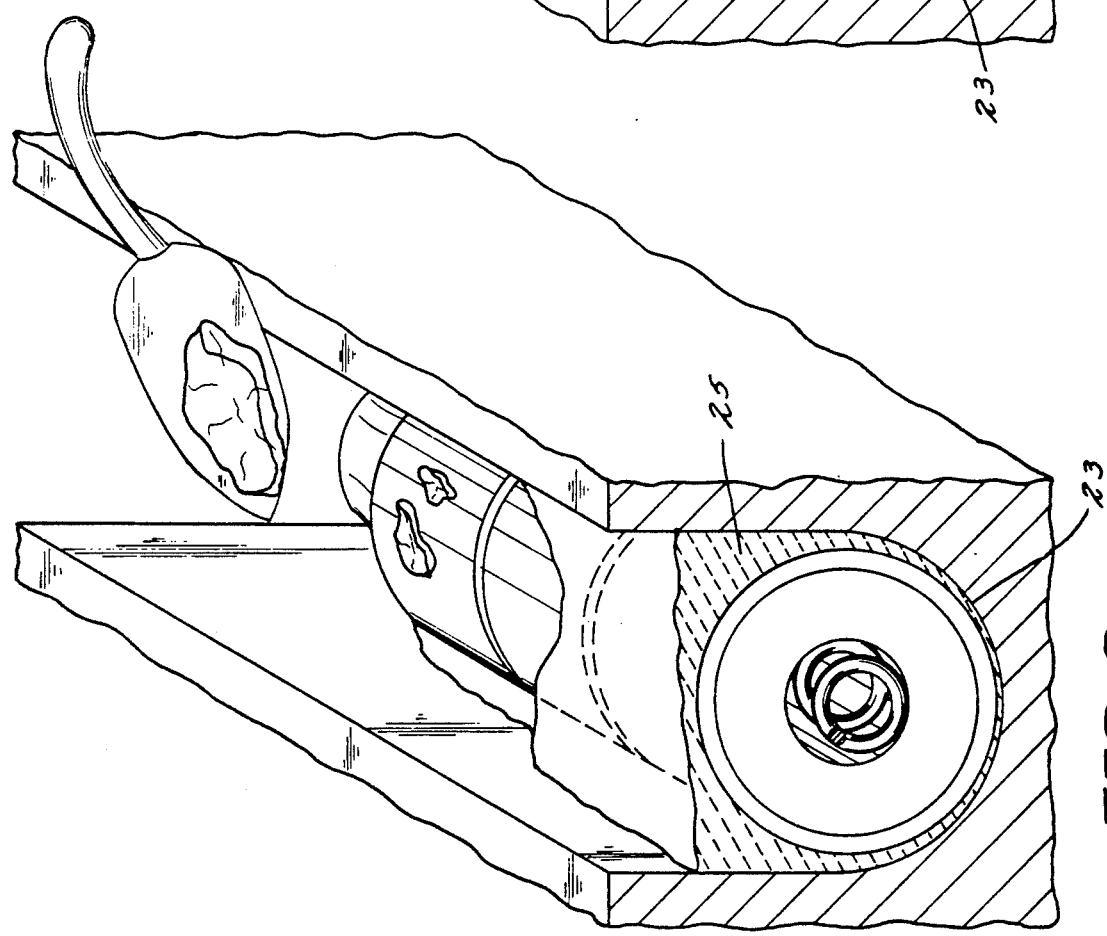
FIG. 8 shows the step of applying the second coating of ceramic adhesive paste to fill the groove and overlay the bead string.

Next, an additional application of ceramic adhesive as applied to cover the bead string and to fill the groove, as shown in FIG. 8.

Figure 9:
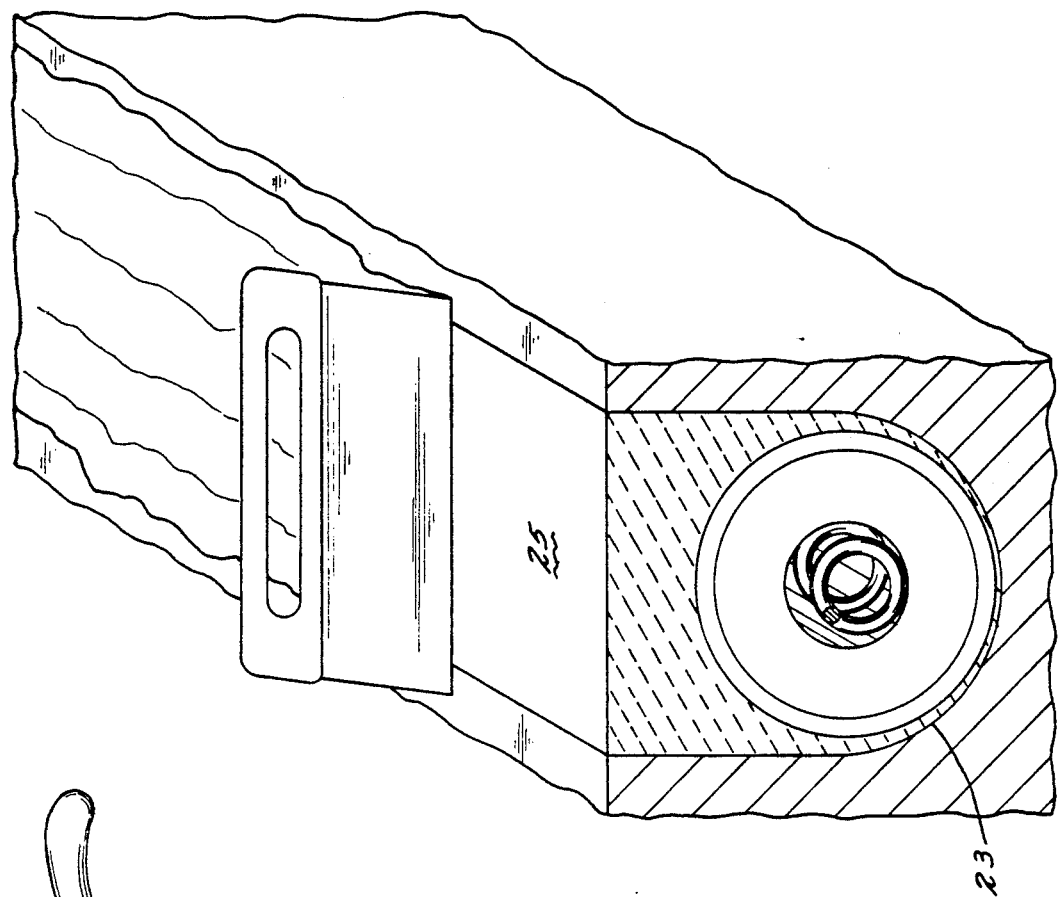
FIG. 9 shows the step of smoothing the surface of the second coating of ceramic paste.

Using a suitable spatula or other tool, excess adhesive is removed so that the surface of the ceramic adhesive matches the surface of the hot runner housing as shown in FIG. 9.

After an interval of air drying ranging from 1 to 6 hours at a temperature ranging from 60° to 100° F. at relative humidity ranging from 0 to 100%, the combined hot runner housing, ceramic adhesive and bead string is placed in a curing oven for a period ranging from 1 to 4 hours at a temperature ranging from 150 to 300° F.

After curing, it is sometimes desirable to sand or abrade the surface of the cured ceramic adhesive to smooth further the surface of the adhesive relative to the surface of the hot runner housing.

Although the cured ceramic adhesive is relatively free of porosity, it is sometimes desirable to coat the surface of the ceramic adhesive with a sealant to improve or enhance the freedom from porosity and to seal the joint between the sidewalls 37 and 38 of the hot runner housing and the ceramic adhesive.

Typical sealants are selected from the group of commercial coatings such as high temperature automotive muffler paint and Aremco Seal.

Figure 11:
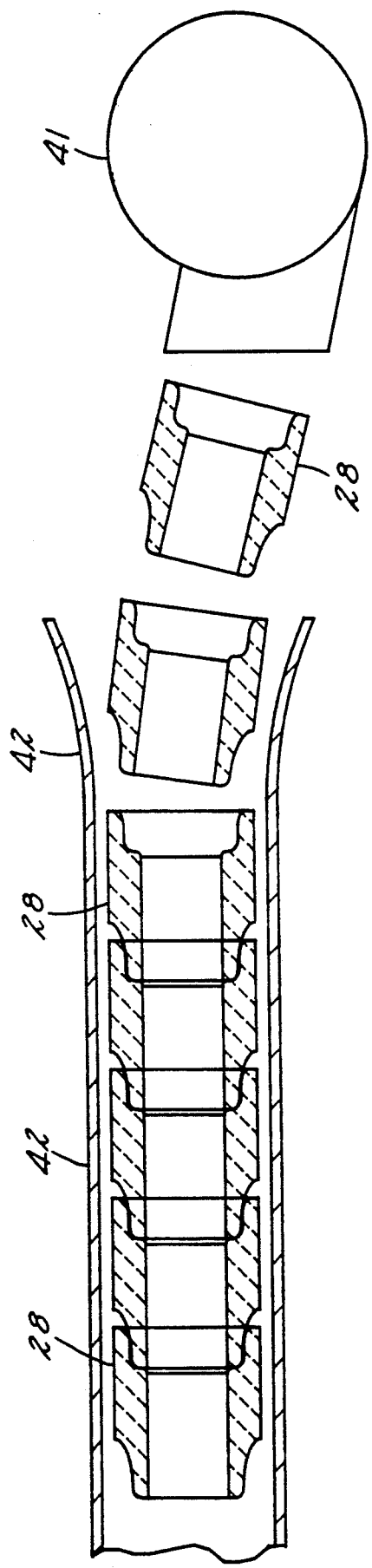
FIGS. 11 and 11A show the method of forming a bead string.
Figure 11A:
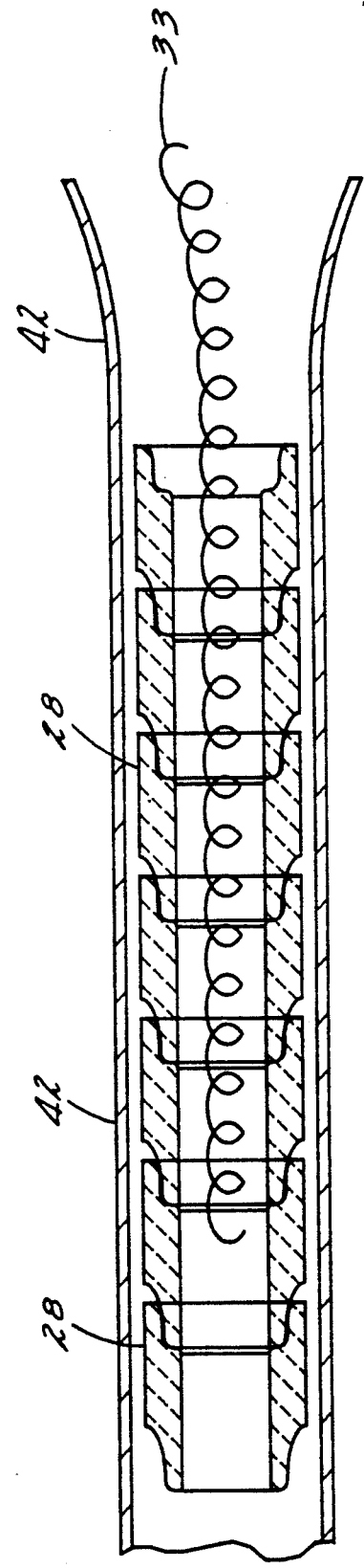

Turning to FIGS. 11 and 11A, the method steps for assembling the bead string are shown wherein a plurality of beads 28 are aligned by a unit such as a vibratory feeder 41 so that the nose 31 of one bead 28 faces the counterbore 32 of the downstream bead.

The beads, so aligned, are funnelled into a tubular member 42. Thereafter the heating wire 33 is inserted to create the bead string.

The feeding of the beads 28 and the feeding of the heating wire 33 are usually conducted continuously so that it is desirable to wind the bead string upon a spool for convenient storage.

In the alternative, predetermined segments of the string are cut to desired lengths and electrical contacts 34 and 36 (FIG. 1) are applied so that the segments are ready for insertion into grooves of a hot runner housing.

Typical ceramic beads are available commercially under the trademarks interlocking ceramic beads and ceramic beads, manufactured by Hoechst Ceram Tec AG and Akinsun Heat Co., Inc. respectively.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In combination, a metallic hot runner housing and a heating element comprising:
   a flow path within the hot runner housing for advancing thermoplastic material,
   a groove formed in the hot runner housing,
   a plurality of cored ceramic beads,
   a heating wire,
   said heating wire being received in said beads to define a string of beads further defining a flexible vertebra-like structure,
   said string of beads being disposed in said groove, and
   ceramic adhesive material disposed in said groove surrounding said string of beads to shield the beads and to fix the string of beads in said groove.

2. The combination of claim 1 wherein the groove defines a tortuous path including acute and obtuse angles.

3. The combination of claim 1 wherein the heating wire is coiled having a predetermined pitch and a predetermined wire gauge.

4. The combination of claim 1 wherein the ceramic material includes an inorganic filler selected from the group consisting of magnesium oxide, aluminum oxide, zirconia and mica.

5. The combination of claim 1 in which the ceramic adhesive adheres to said metallic housing whereby said string of ceramic beads is fixed to said housing.

6. A method of incorporating a heater into a hot runner housing of an injection molding machine containing passages for advancing thermoplastic material comprising the steps of:
   providing a hot runner housing,
   forming a groove in a surface of said housing wherein the groove defines a tortuous path including obtuse and acute angles,
   coating the groove with a curable ceramic adhesive paste,
   placing a heating element in the groove upon said paste,
   said heating element defining a plurality of ceramic beads strung upon a heating wiere to define a flexible vertebra-like structure,
   applying a further coating of said paste to cover said heating element and to fill said groove,
   curing said paste to fix said heating wiere to said housing,
   sanding said cured paste so that its surface is flush with said housing surface, and
   applying a coating of sealant to the surface of the cured paste to seal the paste and to seal the junction between the paste said housing.

* * * * *